United States Patent
Bahlmann

(10) Patent No.: US 6,487,594 B1
(45) Date of Patent: Nov. 26, 2002

(54) POLICY MANAGEMENT METHOD AND SYSTEM FOR INTERNET SERVICE PROVIDERS

(75) Inventor: Bruce F. Bahlmann, White Bear Lake, MN (US)

(73) Assignee: MediaOne Group, Inc., Englewood, CO (US)

(*) Notice: Subject to any disclaimer, the term of this patent is extended or adjusted under 35 U.S.C. 154(b) by 0 days.

(21) Appl. No.: 09/450,543

(22) Filed: Nov. 30, 1999

(51) Int. Cl.$^7$ .............................................. G06F 15/173
(52) U.S. Cl. ............................ 709/225; 707/10; 705/26
(58) Field of Search ........................... 707/10, 102, 202; 709/223–226; 705/26, 27

(56) References Cited

U.S. PATENT DOCUMENTS

| | | | |
|---|---|---|---|
| 5,797,128 A | * 8/1998 | Birnbaum ....................... 707/3 |
| 5,850,426 A | * 12/1998 | Watkins et al. ............. 370/241 |
| 5,966,431 A | * 10/1999 | Reiman et al. ........ 379/115.01 |
| 6,031,904 A | * 2/2000 | An et al. ..................... 370/352 |
| 6,145,002 A | * 11/2000 | Srinivasan .................. 370/546 |
| 6,170,009 B1 | * 1/2001 | Mandal et al. .............. 709/223 |
| 6,189,008 B1 | * 2/2001 | Easty et al. .................... 705/14 |
| 6,199,099 B1 | * 3/2001 | Gershman et al. .......... 345/966 |
| 6,240,174 B1 | * 5/2001 | Silver .......................... 379/230 |
| 2002/0010767 A1 | * 1/2002 | Farrow et al. .............. 709/223 |

* cited by examiner

Primary Examiner—John Breene
Assistant Examiner—Leslie Wong
(74) Attorney, Agent, or Firm—Brooks & Kushman, P.C.

(57) ABSTRACT

A policy management system for an Internet service provider having standalone Internet provisioning servers in different regions includes a central policy database (CPD) for providing centralized configuration and local management of the policies which control aspects of service and level qualities of the Internet servers and for distributing central product definitions to the Internet servers. In addition to the central policy database, the policy management system includes a plurality of regional policy databases each associated with the Internet servers in a respective region. The central policy database is operable with each of the regional policy databases for providing central definitions to the Internet servers. The central policy database stores product, feature, subscriber, and device objects. The objects of the central policy database are operable with the regional policy databases for providing the central definitions to the Internet servers. The product objects define products supported by the Internet service provider and the feature objects define features of the products supported by the Internet service provider. Combinations of feature objects define each product object.

16 Claims, 3 Drawing Sheets

POLICY MANAGEMENT METHOD AND SYSTEM FOR INTERNET SERVICE PROVIDERS

TECHNICAL FIELD

The present invention relates generally to policy servers for use with provisioning systems having Internet servers.

BACKGROUND ART

A provisioning system includes several standalone Internet servers. The Internet servers of a typical provisioning system must be individually configured with each change to the supported quality of service and level of service policies. Unfortunately, if the Internet servers are to support multiple or changing service classes (Internet access products that perform at varying levels of quality and speed) each standalone server must be educated of the new service class before the service class is fully supported by the entire system. This becomes cumbersome when all components of the existing system inherently support the new service but must be manually configured before the service can be made available. Traditionally, product cycles in the Internet provider service industry fall behind advancements in technology. This is due to poorly designed Internet provisioning systems that lag behind the development and deployment of products to keep up with advancements in technology and subscriber demand.

Providing Internet service is one such area where product offerings are driven by technological advances. Much of these advances do not come in any order and, more often than not, entities seeking to benefit financially from them are faced with expensive refitting of their infrastructure. Multiple subscriber organization (MSO) service providers need to be more agile and responsive in the Internet space to expand/retain their growing subscriber base.

In summary, configuring typical provisioning systems is not a scalable process. Essentially it is performed a number of different ways depending on the resources available in each region. Typical provisioning systems are developed based on their individual components and the capability of the components. As a result, provisioning systems must be redesigned with every new feature/product. This is prohibitively expensive to maintain and build upon.

Having a policy management system structured around a clear and identifiable business model enables MSOs to quickly bring new products to market and leverage the readily accessible information about the infrastructure to build and maintain the highest quality of service. Accordingly, what is needed is a policy management system that solves the problems caused by running standalone Internet provisioning servers by linking various aspects of them to a central policy database (CPD).

DISCLOSURE OF INVENTION

Accordingly, it is an object of the present invention to provide a policy management system having a central policy database (CPD) for providing centralized configuration and local management of the policies which control aspects of service and level qualities of standalone Internet provisioning servers.

It is another object of the present invention to provide a policy management system having a CPD for distributing central product definitions to standalone Internet provisioning servers.

It is a further object of the present invention to provide a policy management system having a CPD provided with feature objects and product objects in which the products are defined by selected feature combinations.

In carrying out the objects and other objects, the present invention provides a policy management system for an Internet service provider having a plurality of Internet servers in different regions. The system includes a plurality of regional policy databases each associated with the Internet servers in a respective region and a central policy database operable with each of the regional policy databases for providing central definitions to the Internet servers.

Preferably, the central policy database stores a product object and a feature object. The objects of the central policy database are operable with the regional policy databases for providing the central definitions to the Internet servers. The product objects define products supported by the Internet service provider. The feature objects define features of the products supported by the Internet service provider. Preferably, the feature object includes a plurality of feature objects and the product object includes a plurality of product objects. Combinations of feature objects define each product object.

Further, in carrying out the objects and other objects, the present invention provides a policy management system for an Internet service provider having a plurality of Internet servers in different regions. The system includes a plurality of regional policy databases each associated with the Internet servers in a respective region and a central policy database operable with each of the regional policy databases. The central policy database stores a product object, a feature object, a device object, and a subscriber object. The objects of the central policy database are operable with the regional policy databases for providing central definitions to the Internet servers. The device object defines a device supported by the Internet service provider and the subscriber object defines a subscriber supported by the Internet service provider.

These and other objects, features, and advantages will be readily apparent upon consideration of the following detailed description in conjunction with the accompanying drawings.

BEST MODE FOR CARRYING OUT THE INVENTION

Figure 1:
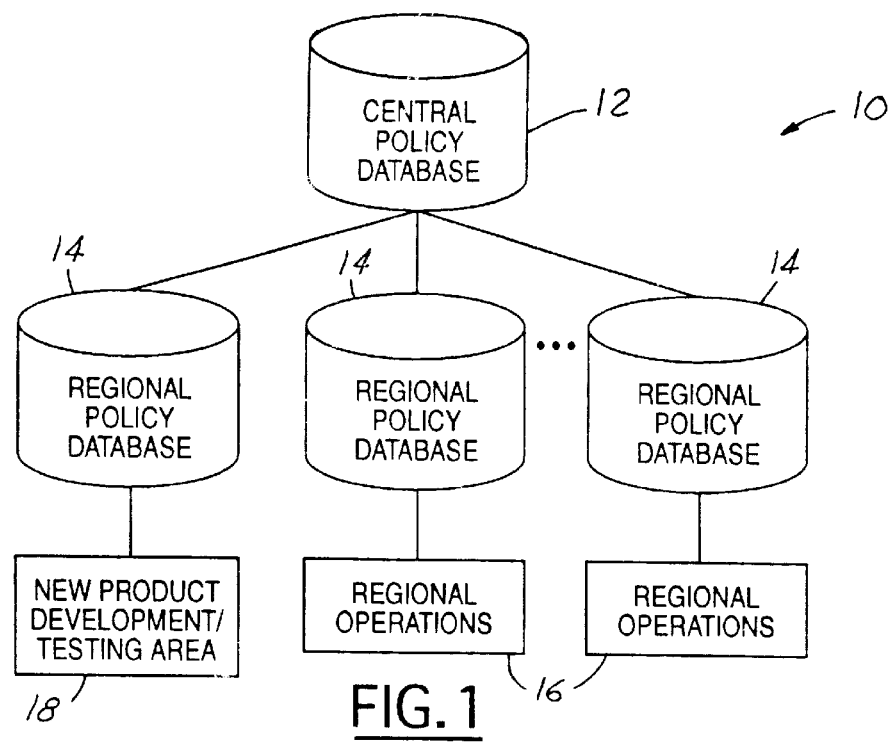
FIG. 1 illustrates a policy management system in accordance with the present invention.

Referring now to FIG. 1, a policy management system 10 in accordance with the present invention is shown. Policy management system 10 includes a hierarchy of databases. A central policy database (CPD) 12 is connected to a plurality of regional policy databases (RPD) 14. Each RPD 14 has an associated regional operation 16 or a new product development/testing area 18. Each regional operation 16 has at least one Internet provisioning server for providing Internet service to subscribers. New product development/testing area 18 is an operation for developing new Internet service devices, products and features for subscribers.

Policy management system 10 enables multiple subscriber organization (MSO) Internet service providers to (a) standardize the infrastructure, (b) streamline deployment of new products, and (c) speed outage detection and correction. Policy management system 10 accomplishes these features by managing and inter-relating the components of the regional operations as well as the differences between the regional operations. Policy management system 10 accomplishes these features by storing the data aspects which describe the control and the infrastructure in a real database, i.e., CPD 12. CPD 12 is available for periodic review, analysis, and maintenance.

Using this model, various database objects reside in CPD 12 and RPDs 14 while the actual data is located in each region. Included with each database object are the necessary business rules, applications, and work flow needed to enable the new technology. This information is used by provisioning support systems (i.e., hsdtools, service order processors, etc.) so when they encounter a device they will be able to intelligently process (examine, provision, modify, deprovision, etc.) the device.

The information regarding the infrastructure elements that CPD 12 needs to store includes all router interfaces and associated router configurations; networks, policies, and service group configurations (provisioning server components); Ethernet switches/configurations; all reserved static Internet Protocol (IP) addresses and their associated information including host names, supported customer premise equipment (CPE)/cable modem termination system (CMTS) equipment and their associated configurations; and service group definitions and their associated mappings to actual products. Once assembled this information must be made available for regional analysis. This implies that the data must be distributed by region and accessible from any location.

Figure 2:
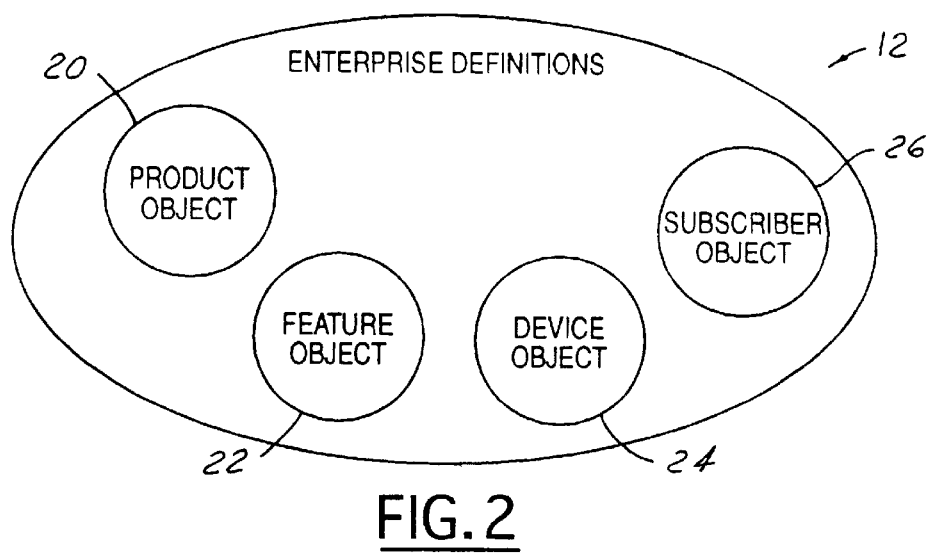
FIG. 2 illustrates the central policy database (CPD)
Figure 3:
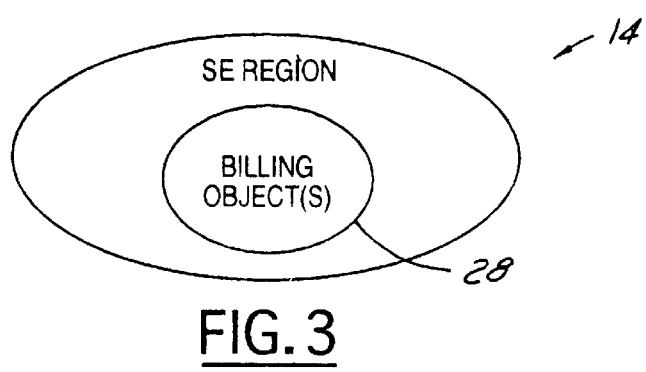
FIG. 3 illustrates the regional policy database (RPD)

Referring now to FIGS. 2 and 3 with continual reference to FIG. 1, CPD 12 and RPDs 14 will be described in greater detail. CPD 12 is an enterprise database (object) that contains the basic framework of all products maintained by MSOs, all product features, all devices supported by the infrastructure of policy management system 10, and all subscriber types to which policy management system 10 services. Policy management system 10 solves the problem caused by running standalone provisioning servers by linking various aspects of them to CPD 12. CPD 12 enables central product definitions to be distributed to all locations and all servers which require an up to date service class offering. Any regional dependency that exists which prohibits support for new service class transparently blocks deployment of the service class in that region until necessary upgrades and/or additional hardware/software for supporting the new service are activated. As a result, policy management system 10 allows MSOs to centrally deploy new service classes with no additional configuration. This allows the MSOs to quickly react to subscriber demand for products, standardize product offerings, and prohibit unauthorized service class offering in the ranks.

CPD 12 defines objects such as product object 20, feature object 22, device object 24, and subscriber object 26. These objects describe things like products, currently supported CPE and infrastructure equipment, and targeted subscriber types. For example, one device object might be a LANCity legacy cable modem. Within this device object all the LANCity specific characteristics, processes, and dependencies are defined. Once the object is created and a part of CPD 12, then the object is made available to all regions instantly. Thus, for instance, any region interested in using LANCity modems could use them because the object informs the right systems how to process these devices. Another example would be a residential subscriber object. This object describes all the necessary information which makes up a residential subscriber (lightweight directory access protocol (LDAP) fields, operations environment, etc.).

The product objects of CPD 12 are not dependent on device objects. However, the types of devices a region uses may limit the capability of a particular product object. Once defined, the project object is available for MSO wide use because all provisioning systems use CPD 12 for their configuration. Roll-out schedules are dependent on developing/testing product objects rather than building end-to-end products. In addition, things like simple network management protocol (SNMP) passwords and supported personal firewall options could be maintained enterprise wide in CPD 12 or regional objects could define these.

Within RPD 14 an example of a regional object would be a billing object 28. Billing object 28 describes the interface to the regional billing system allowing interaction with various other objects. Putting the interface of billing object 28 into the region space enables higher level objects to contain non billing system specific information (such as what is the cost associated with the object).

By using the central/distributed configuration databases provided by CPD 12 and RPDs 14, products can be quickly brought out to market and the readily accessible information about the infrastructure can be leveraged to build and maintain the highest quality of service achievable. Some possible outcomes as a result of implementing CPD 12 and RPDs 14 include: 1) global IP address management; 2) centralized and standardized product definition and support; 3) rapid centralized product development and deployment; 4) regional and company wide modeling; 5) rapid renumbering through automated systems configuration; 6) MSO-wide network diagram capacity; 7) MSO-wide frequency spectrum allocation; 8) centralized remote network operations and management; and 9) centralized subscriber care support of all CPE and CMTS.

In order for policy management system 10 to be developed and sustained there are several requirements that must be met. The requirements are as follows: standardized product, generalized product descriptions and components, standardized billing system interfaces, and standardized product support system interfaces.

The standardized product requirement means that each product sold by the MSO must be the same across the entire MSO. For example, if a basic residential Internet service is offered in any two (or more) regions, the features, cost, etc., of the product must be the same across all regions in which it is being offered.

The generalized product descriptions and components requirement means that each standardized product that is defined at the enterprise level is void of any regional dependent capability or responsibility. This generalized definition must also accommodate any regions that for some reason exceed/lack the capability of other regions. In other words, the same standard product definition is generalized enough to accommodate all regions capable (one way or another) of deploying the product unless necessary hardware/software to support the product does not yet exist in a region.

The standardized billing system interfaces requirement means that all interfaces to "regional" billing systems is standardized. Commands to add, modify, or deactivate a billing account are supported by an Automatic Programming Interface (API). The standard API will be published for billing system vendors to support future products and/or releases.

The standardized policy support system interfaces requirement means that policy support system interfaces such as APIs to provisioning servers, telephony switches, subscriber management systems (SMS), routers, etc., are standardized to support policy management system 10 for managing all the components necessary for delivering a product. These interfaces will be published and made available to vendors in their respective areas to support future products and/or releases.

Figure 4:
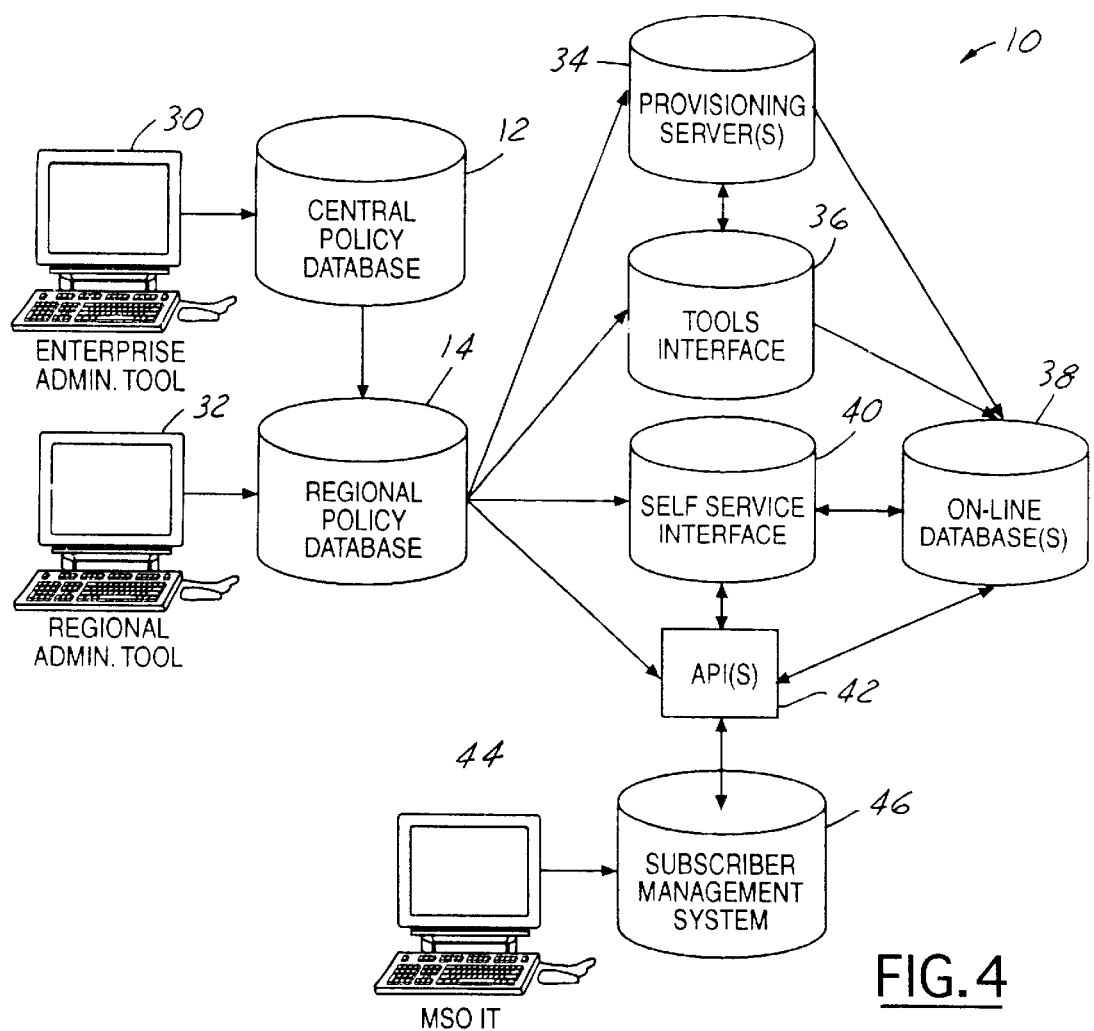
FIG. 4 illustrates a single regional slice of the policy management system in accordance with a preferred embodiment of the present invention.

Referring now to FIG. 4, a single regional slice of policy management system 10 in accordance with a preferred embodiment of the present invention is shown. It is to be appreciated that several other regionally deployed applications tie into policy management system 10 for product configuration and support. Policy management system 10 provides synchronization between all applications that must be properly configured to support the deployed products. The components of policy management system 10 work together to provide various access points for MSOs, installation, network operations, etc. The components of policy management system 10 will now be described in greater detail.

CPD 12 is a repository for high level definitions. The relationship between CPD 12 and RPD 14 is that while they both share the same schema definitions, there is no replication of data from RPD 14 to CPD 12. Data pertaining to regions stay within regions and referral used by CPD 12 enables look ups on any regional data from a single point. In this regard, CPD 12 acts as a pointer to certain public data contained in RPD 14.

RPD 14 is a repository for regional data such as supported subscriber services and features, service management systems (SMS) product code particularities, products supported, and regional applications deployed. Through RPD 14 all day to day transactions are managed. When a new product is deployed at CPD 12 the product becomes available once the product is mapped to its product code (unless the region supports standardized product codes, in which case it would be immediately available to the region) assuming that the product does not have a dependency on something that is non existent in the region. Other links to RPD 14 include interfaces MSO front end applications used by subscriber service representatives to provide a current listing of available services supported by the network provider.

An enterprise administration tool 30 provides an entry point for enterprise objects to be created, modified, and removed in CPD 12. Through tool 16, each product object 20, feature object 22, device object 24, and subscriber object 26 can be maintained. Anything not defined in CPD 12 is not supported.

A regional administration tool 32 provides an interface for regional configuration with RPD 14 to overwrite those of CPD 12. Tool 32 maps product codes for individual MSO services while being under the control of the MSO. Tool 32 maps features to particular applications deployed in the region to support these features.

RPD 14 is operable with at least one regional provisioning server 34. Provisioning server 34 is any hardware and/or software that supports Internet service products and features. Examples of provisioning servers include domain name servers (DNS) for providing host names to CPEs, dynamic host configuration protocol (DHCP) servers for providing dynamically assigned IP addresses to hosts, and trivial file transfer protocol (TFTP) servers which provide configuration files for cable modems. The provisioning servers determines what products and features are supported in each region. Provisioning server 34 uses data in RPD 14 to configure its service groups that are allowed in each region. RPD 14 dictates which service groups are correctly mapped to MSO billing codes and thus fully supported even though other service groups are defined in CPD 12.

Tools interface 36 is the gateway to troubleshooting and network management. Tools interface 36 takes data from provisioning server 34, RPD 14, and on-line database 38 to resolve subscriber and network problems. Tools interface 36 also streamlines configuration and reporting procedures. Tools interface 36 uses data from RPD 14 to work with devices supported in the region and communicate with these devices via their correct passwords and community strings (where appropriate).

Self service interface 40 enables subscribers to activate and maintain their Internet account without intervention from the MSO. RPD 14 provides self service interface 40 with the supported service selection and regional data it needs to interface with regional specific applications. RPD 14 provides direction to self service interface 40 for what is supported within the region and what the standard operating procedures are for carrying out the subscriber requests.

Application programming interface (API) 42 is a lightweight directory access protocol (LDAP) client. API 42 is configurable via fields in LDAP which allow it to carry out transactions with a MSO subscriber management system (SMS). All of the intelligence associated with API 42 comes from LDAP so as to not require any additional development during its deployment. If, for example, a new SMS is encountered during deployment a new SMS object is defined in the LDAP and the particularities are entered into its fields such that the front end of API 42 remain the same while the back end is accommodated by the new LDAP object.

MSO information technology (IT) 44 signifies the amount of MSO configuration that is needed to define new products as they are launched. MSO IT 44 needs to be maintained as long as the MSO remains authoritative in terms of services and features the subscribers have chosen or as long as the MSO continues to map individual services or features to unique billing codes. Improvement of the latter is attractive to the network provider because the provider would not have to map each and every new product service and/or feature to a unique MSO billing code. This process also minimizes some of the return the network provider can achieve through a product management system. Instead, if the MSO makes available a set of standard billing codes that the network provider could post similarly priced subscribed services and/or products, the MSO would not have to administer both the SMS and RPD 14.

Subscriber management system (SMS) database 46 represents the repository of subscriber specific data. SMS database 46 represents the only place where subscriber name, address, billing information, etc., reside. All other systems maintained by the network provider do not contain any duplicate information to that of SMS database 46 except for the account number. The account number is the network providers single reference back to each MSO subscriber. By using only the account number, the network provider significantly reduces the risk if any of its subscriber data is exposed. This also prohibits unauthorized access to confidential MSO subscriber data and limits the responsibility of the network provider from maintaining meaningless data stores of subscriber high speed data system configurations.

On line database 38 is an LDAP database for the network provider to use to store the high speed data system configuration for its subscribers. On line database 38 uses the MSO account number to map each configuration or set of configurations back to specific MSO subscribers. On line databases 38 avoid any duplication of data that is needed from the MSO SMS and are void of any subscriber identifying information except the account number assigned to the subscriber by their MSO.

An example of a working policy management configuration would be to support a basic level of residential Internet service. For this example, the regional configuration database provides service group configuration to provisioning server 34, makes available this service group offering to self service interface 40 and SMS 46, and provides interfaces to/from the SMS to link this service offering to the appropriate billing code for subscriber billing.

Figure 5:
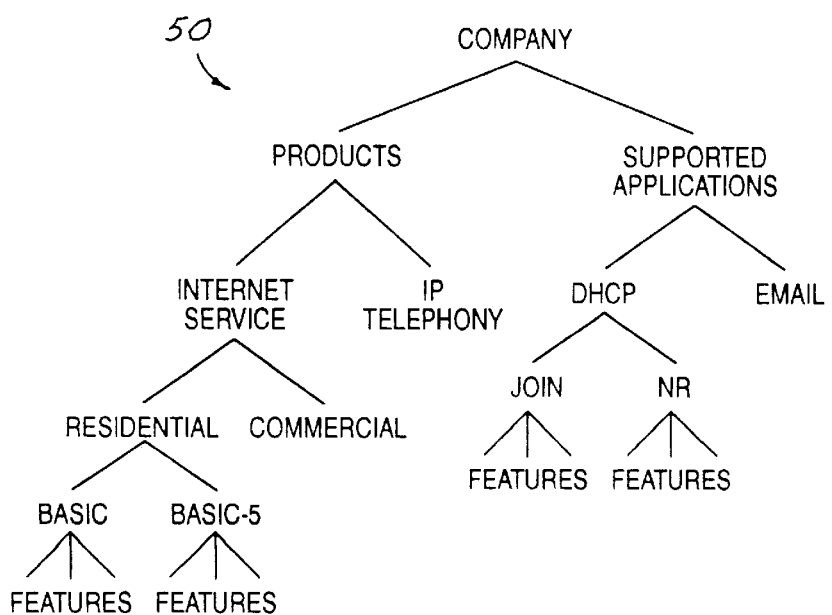
FIG. 5 illustrates a data model tree of the policy management system.

Referring now to FIG. 5, a hierarchy 50 of policy management system 10 is illustrated. The data model for policy management system 10 focuses around creating a standardized environment that is conducive to plug-n-play components all with similarly supported features. A feature is an application independent entity that together along with other features makes up a product.

Hierarchy 50 enables individual product features to map to their application supported counterparts. The supported counterparts are determined by what is actually deployed in a particular area (or region). For example, assume that a feature of the "basic" product is that of a service group called "1.5m×300k". This service group is generically defined in both DHCP server objects and associated with the corresponding configuration necessary to configure that feature on that DHCP server type. In the region, the DHCP server deployed allows generically defined product features to map to their correct DHCP supported references and the DHCP server is able to pull its service level parameters from product management system 10 to configure its service groups.

Table 1 illustrates a data model for a product. The product data models leverage a hierarchical method of baseline and inheritance to reduce replication in similar grouped product lines as well as simplify management of these grouped product lines.

TABLE 1

Product Data Model:

| FIELD | TYPE | DESCRIPTION |
| --- | --- | --- |
| PName | String | Name of product. |
| PType | String | Product, group, or company. Allows like product attributes to be inferred by association with higher level object (group/company). |
| PRelative | String | Affiliation of product with a parent object (optional). |
| PCost | Integer | Cost to the subscriber for product (price). |
| PDependency | String | System(s) dependencies for available product. |
| PFeature[0-n] | String | Features of a product. |
| PActivationDTG | String | Time/Date the product was subscribed. |
| PAllowedVariance | String | Minimum number of hours before allowing this product to be changed. |

Figure 6:
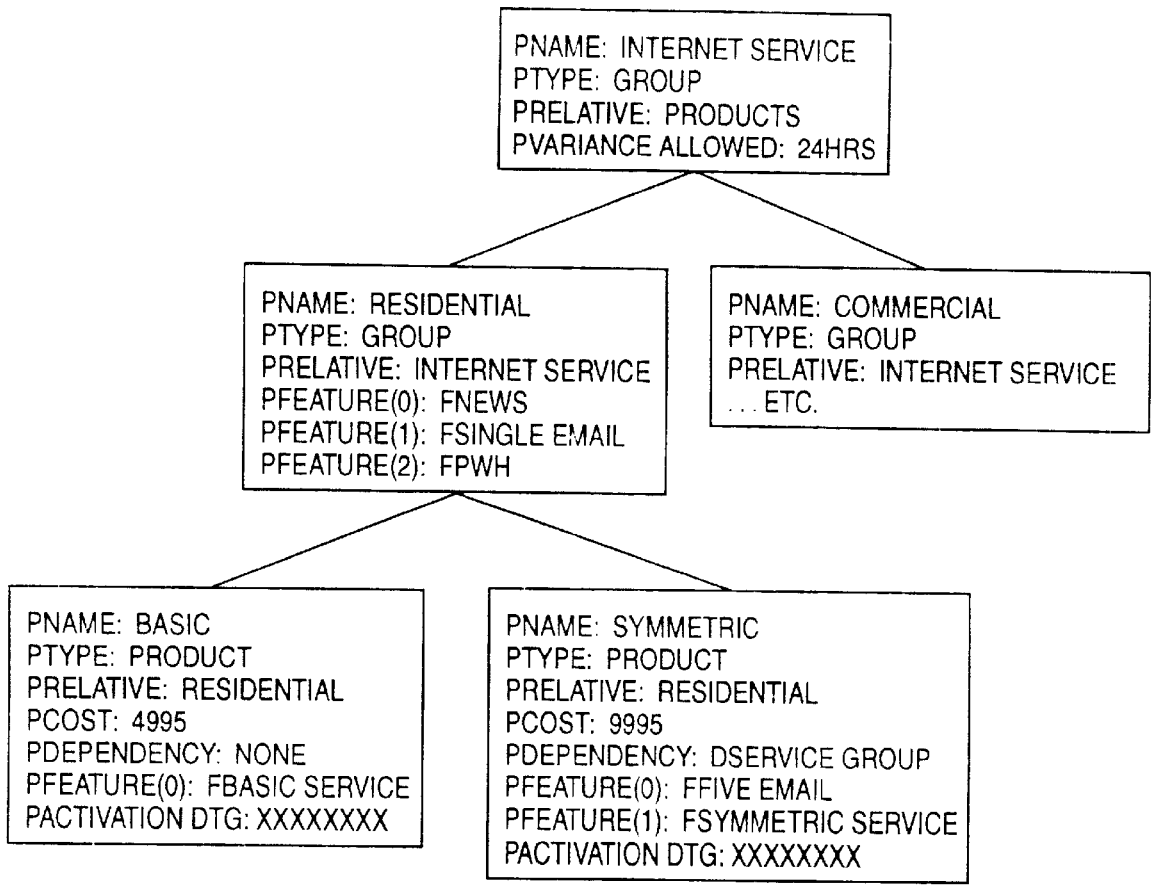
FIG. 6 illustrates an example of how the data model of the policy management system is implemented.

Referring now to FIG. 6, a tree 60 illustrating how the data model is implemented is shown. Tree 60 represents the definition of a "basic" and "symmetric" residential service product. Each product is associated with one or more parents and also associated with one or more features. A parent is a higher leveled object that enable global changes to a subset or all products. A feature describes some particular functionality associated with a product. For example, one feature might be personal web hosting (PWH). Because PWH is associated with residential group, all objects with parent residential will support the PWH.

Both products and features must initially be defined in CPD 12 before they can be used. While the product object is made available to RPD 14 it is not administered from anywhere but CPD 12. This allows centralized policy management to be maintained. Unlike the product object, features can be regionally administered. This allows them to adhere to any limitations or restrictions that may exist within the region while not obstructing other regions that perhaps have no limitations from offering the feature as it is intended.

Separating the product data model from individual features allows the features to evolve with technology while not interfering with the products which they are included. If features were directly part of products each new technological advancement would mean the products would need to be reworked. Instead, if a new technology improves a feature, the feature model is reworked to accommodate the new technology while leaving the product definition untouched.

Features are at a lower level than products. Features map select application functionality to independent objects. These objects represent the underlying functionality of applications and consequently have larger dependencies on the hardware and software that is deployed. It is at the feature level that "regional" specificity can impact what features will be a part of a product that is defined at the higher level and offered in the region. For example, if a region does not have the capability to provide five email accounts (FfiveEmail) this feature would still exist, however, it would not be supported. A feature that is not supported is redefined or cleared by a regional definition of the same feature. The applying of products and features allows an inheritance model in which anything defined in CPD 12 can be retained, redefined, or cleared as these objects enter the regional space.

Features are independent objects that can be added to any product to create a variant. The variants enable the network provider to offer customizable service that includes allowing subscribers to add numerous additional features to their service. With the addition of each feature, the cost of the service can change by the amount associated with the feature. Table 2 illustrates a data model for a feature.

TABLE 2

Feature Data Model:

| FIELD | TYPE | DESCRIPTION |
| --- | --- | --- |
| FName | String | Name of feature. |
| FType | String | Feature type (Email, News, Service Type, etc). |
| FSName | String | Feature select name to be displayed as choice. |
| FCost | Integer | Your cost of offering this feature (used for incremental additional to product). |
| FDependency | String | System(s) dependencies for available feature. |
| FAdd | String | API call to add feature. |
| FModify | String | API call to change feature (if supported). |
| FRemove | String | API call to remove feature. |
| Ffield[0-n] | String | Required input fields in form of key = value pairs. |
| Fconf | String | Required to configure this feature. |

Thus it is apparent that there has been provided, in accordance with the present invention, a policy management system that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A policy management system for an Internet service provider having a plurality of Internet provisioning servers in different regions, the system comprising:

a plurality of regional policy databases each storing Internet provisioning data and each associated with the Internet provisioning servers in a respective region, wherein the Internet provisioning servers use the Internet provisioning data of their associated regional policy database to provision Internet service in the respective region; and a central policy database operable with each of the regional policy databases, the central policy database storing a product object, a feature object, a device object, and a subscriber object, the objects of the central policy database are operable with the Internet provisioning data of the regional policy databases for providing central definitions of quality of service provisioning policies and level of service provisioning policies to the Internet provisioning servers.

2. The system of claim 1 wherein:

the feature object includes a plurality of feature objects and the product object includes a plurality of product objects, wherein selected combinations of feature objects define each product object.

3. The system of claim 1 wherein:

the product object defines a product supported by the Internet service provider.

4. The system of claim 1 wherein:

the feature object defines a feature of a product supported by the Internet service provider.

5. The system of claim 1 wherein:

the device object defines a device supported by the Internet service provider.

6. The system of claim 1 wherein:

the subscriber object defines a subscriber supported by the Internet service provider.

7. The system of claim 1 wherein:

the regional policy databases each store billing objects, wherein a billing object defines billing supported by the Internet service provider.

8. The system of claim 1 further comprising:

an enterprise administration tool operable with the central policy database for managing the objects stored in the central policy database.

9. The system of claim 1 further comprising:

a regional administration tool operable with at least one regional policy database for managing objects stored in the at least one regional database.

10. The system of claim 1 further comprising:

a tools interface operable with at least one regional policy database and at least one Internet provisioning server for communicating with devices supported by the Internet service provider in a region.

11. The system of claim 1 further comprising:

a self service interface operable with at least one regional policy database for enabling subscribers supported by the Internet service provider to carry out subscriber requests.

12. The system of claim 1 further comprising:

a subscriber management system operable with at least one regional policy database and having subscriber data.

13. The system of claim 1 further comprising:

an on line database operable with at least one Internet provisioning server for storing subscriber device configurations.

14. A policy management system for an Internet service provider having a plurality of Internet provisioning servers in different regions, the system comprising:

a plurality of regional policy databases each storing Internet provisioning data and each associated with the Internet provisioning servers in a respective region, wherein the Internet provisioning servers use the Internet provisioning data of their associated regional policy database to provision Internet service in the respective region; and a central policy database operable with each of the regional policy databases, the central policy database storing product objects and feature objects, wherein selected combinations of feature objects define each product object, the objects of the central policy database being operable with the Internet provisioning data of the regional policy databases for providing central definitions of quality of service provisioning policies and level of service provisioning policies to the Internet provisioning servers.

15. The system of claim 14 wherein:

the product objects define products supported by the Internet service provider.

16. The system of claim 14 wherein:

the feature objects define features of products supported by the Internet service provider.

* * * * *